Oct. 28, 1924.

T. M. EXUM 1,513,165

BICYCLE ATTACHMENT

Filed Sept. 30, 1922

Inventor:
Thomas M. Exum.

By Edson Bro's

Attorneys

Patented Oct. 28, 1924.

1,513,165

UNITED STATES PATENT OFFICE.

THOMAS MATTHEW EXUM, OF FULTON, KENTUCKY.

BICYCLE ATTACHMENT.

Application filed September 30, 1922. Serial No. 591,610.

*To all whom it may concern:*

Be it known that THOMAS MATTHEW EXUM, a citizen of the United States, residing at Fulton, in the county of Fulton and State of Kentucky, has invented certain new and useful Improvements in Bicycle Attachments, of which the following is a specification.

This invention relates to improvements in bicycles, more especially that type known or termed as "side-carrying," the same being designed or adapted to function as a luggage-carrier, also for other carrying purposes, as well as riding purposes.

The invention has for its object primarily to provide for extreme simplicity and the use of light structural frame-work, which may be considered as of a skeletonized character, and inexpensive in manufacture and ready of application to a bicycle of any type or make, while in construction, it is readily adaptable of being carried out at the minimum outlay or expenditure of labor.

Other objects of the invention will be apparent from the following description and accompanying drawing thereof, as will be appreciated and understood together with the first-recited statement of objects.

The invention consists, therefore, of certain instrumentalities and features of construction substantially as hereinafter more fully disclosed and defined by the appended claims.

In the accompanying drawing is illustrated the preferred or one embodiment of my invention, wherein it will be understood that various changes and modifications as to the detailed construction and arrangement of parts may be made without departing from the spirit or scope of the invention as covered by the claims, and in which drawing:

Figure 1:
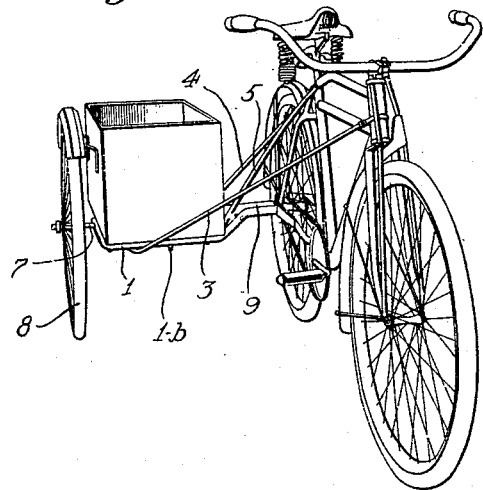
Fig. 1 is a perspective view showing a bicycle, with my luggage carrier attachment applied thereto.
Figure 2:
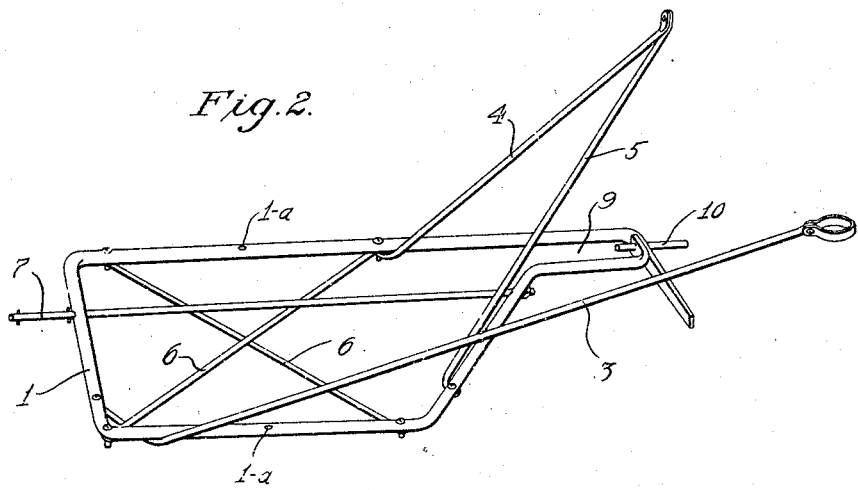
Fig. 2 is a detached perspective view of my invention.

In putting my invention into practice, I use a frame-work 1, approximately rectangular, as shown, to provide for conveniently mounting thereupon a container, for luggage, articles of merchandise, etc., or to provide for riding purposes, as may be desired. Frame 1 is of such transverse section that it will readily accommodate the container thereupon, the frame 1 having perforations 1$^a$ provided therethrough to receive fastenings 1$^b$ for suitably fastening the container thereon. The frame 1 is provided with attaching elements, as for instance, a formed rod 3, a rear brace 4, a lateral brace 5, cross-braces 6, and an axle 7. The axle 7 carries the track-wheel 8, as is well known, said axle having bearings in the lateral members of the frame 1, with the end opposite the wheel-carrying end passed through the lateral frame member, and nut-equipped to be held thereat. The frame 1 on the inner side, is contracted, to form a bearing for one end of the bicycle axle 10, the bicycle and the side-carrying attachment, together with the track wheel and its axle, thus mutually reinforcing each other.

I claim:

1. In a side-carrying bicycle, a frame attachment, a container, said attachment being of generally rectangular type and adapted to function as a carrier for said container, said attachment being provided with bracing attaching members for its attachment to the bicycle, a track-wheel-axle applied to said attachment, with the end thereof opposite its wheel-carrying-end bearing in the distant portion of said frame-attachment, the latter having an attenuated portion extended beyond the plane of an edge thereof and adapted to function as a bearing for the axle of the bicycle.

2. In a bicycle side carrier of the character described, a main frame formed of a single bent bar the frame having its portion nearest the bicycle contracted, the two ends of the bar meeting and overlapping at the end of said contracted portion to form a frame of double thickness at that point adapted to form a bearing for the axle of the bicycle, one of the ends of the bar being adapted to extend beyond the contracted portion to form a brace, and a wheel attached to said frame.

3. In a bicycle side carrier of the character described, a main frame formed of a single bent bar, a track wheel axle carried by said frame and having its end opposite to the wheel carrying end bearing in the distant portion of the frame, said frame having a contracted portion, the two ends of the bar meeting and overlapping to form the end of said contracted portion thereby making a frame of double thickness at that point adapted to form a bearing for the axle of the bicycle.

In testimony whereof he affixes his signature.

THOMAS MATTHEW EXUM.